United States Patent
Sikora et al.

(10) Patent No.: US 7,467,042 B2
(45) Date of Patent: Dec. 16, 2008

(54) METHOD AND CONTROL UNIT FOR DIAGNOSING A VALVE LIFT ADJUSTMENT SYSTEM OF AN INTERNAL COMBUSTION ENGINE

(75) Inventors: Sven Sikora, Stuttgart (DE); Thomas Melzig, Leonberg-Höfingen (DE); Nils Nagel, Leonberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 11/843,801

(22) Filed: Aug. 23, 2007

(65) Prior Publication Data

US 2008/0051972 A1 Feb. 28, 2008

(30) Foreign Application Priority Data

Aug. 23, 2006 (DE) .................... 10 2006 039 556

(51) Int. Cl.
*F02D 28/00* (2006.01)
*F02D 3/02* (2006.01)
*G06F 19/00* (2006.01)

(52) U.S. Cl. .................................. 701/114; 123/90.16
(58) Field of Classification Search ................. 701/114, 701/115, 101, 102; 123/90.16, 90.15
See application file for complete search history.

(56) References Cited

U.S. PATENT DOCUMENTS

| 4,909,194 | A | * | 3/1990 | Bauer ..................... 123/90.15 |
| 5,417,187 | A | * | 5/1995 | Meyer et al. ............ 123/90.17 |
| 6,213,068 | B1 | | 4/2001 | Hassdenteufel |
| 6,357,404 | B1 | | 3/2002 | Deeg |
| 2005/0125139 | A1 | | 6/2005 | Keller et al. |

FOREIGN PATENT DOCUMENTS

| DE | 196 06 054 10 C2 | 7/1998 |
| DE | 198 57 183 A1 | 6/2000 |
| DE | 199 57 157 A1 | 6/2001 |
| DE | 10316900 A1 | 11/2004 |
| DE | 103 55 335 A1 | 6/2005 |
| DE | 10 2004 030 992 A1 | 1/2006 |
| WO | WO 99/63213 | * 12/1999 |

* cited by examiner

*Primary Examiner*—Hieu T Vo

(57) ABSTRACT

A method assesses the functional capability of a gas exchange valve lift adjuster of an internal combustion engine as a function of a measure of rotational oscillation amplitudes of a camshaft. The measure of the rotational oscillation amplitudes is formed repeatedly. In a situation in which the gas exchange valve lift adjuster is to change the valve lift, it is checked whether a change in the measure of the rotational oscillation amplitudes occurs. The gas exchange valve lift adjuster is assessed as being functional if a measure for the change is greater than a predetermined threshold value. A control unit is programmed to perform such steps.

24 Claims, 5 Drawing Sheets

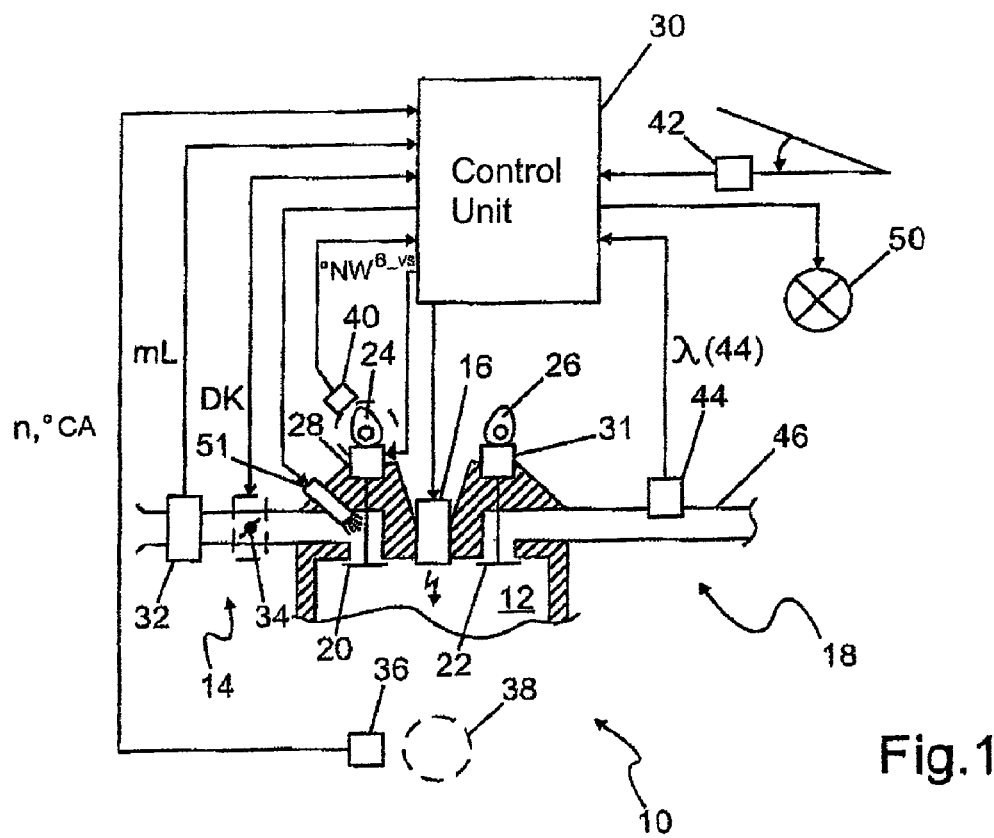
Fig.1
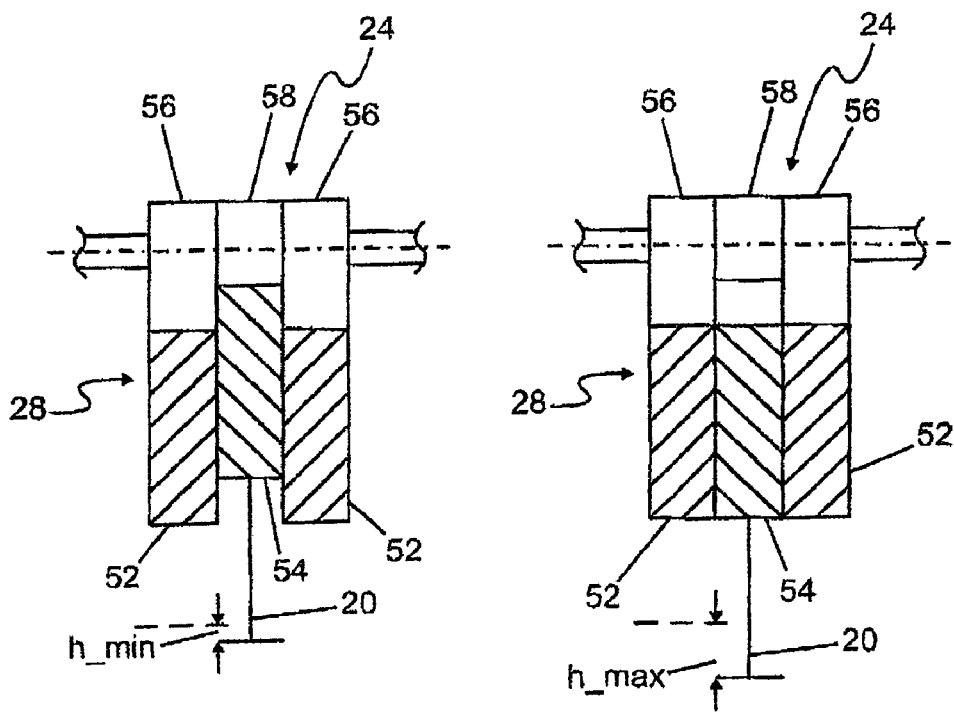
FIG.2A
PRIOR ART
FIG.2B
PRIOR ART

METHOD AND CONTROL UNIT FOR DIAGNOSING A VALVE LIFT ADJUSTMENT SYSTEM OF AN INTERNAL COMBUSTION ENGINE

CROSS-REFERENCE TO RELATED APPLICATION

This application claims the priority, under 35 U.S.C. § 119, of German application DE 10 2006 039 556.5, filed Aug. 23, 2006; the prior application is herewith incorporated by reference in its entirety.

BACKGROUND OF THE INVENTION

Field of the Invention

The invention relates to a method for assessing the functional capability of a gas exchange valve lift adjuster of an internal combustion engine in dependence on a measure of rotational oscillation amplitudes of a camshaft and to a control unit which is set up for assessing the functional capability of a gas exchange valve lift adjuster of the internal combustion engine in dependence on the measure of the rotational oscillation amplitudes of the camshaft.

A method of the type and a control unit of the type are in each case known from published, non-prosecuted German patent application DE 199 57 157 A1, corresponding to U.S. Pat. No. 6,357,404. Details regarding a mechanical implementation of a lift, which can be switched between a minimum and a maximum value, of a gas exchange valve can for example be found in German patent DE 196 06 054 C2 (see in particular FIG. 2 in the document).

The applicant also offers motor vehicles having a system for adjusting the angular position of intake camshafts and for switching the valve lift of the intake valves. This so-called "Variocam Plus" system primarily permits high power and torque values in addition to the best possible running quality, favorable fuel consumption and low pollutant emissions.

The valve lift adjusting system is composed of switchable bucket tappets which are controlled by an electrohydraulic switching valve. The bucket tappets are composed of two tappets which bear one inside the other and can be locked by a pin. Here, selectively the inner tappet acts on the intake valves via a small cam of the camshaft, or the outer tappet acts on the intake valves via a large cam of the camshaft. The small cam generates the small lift and the large cam generates the large lift. The variation of the intake control times is carried out in a stepless fashion by a camshaft adjuster which is attached at the end side of the camshaft and which operates on the vane principle. The actuation takes place by use of an electrohydraulic control valve.

In order for example to optimize the gas intake during the warm-running phase at low temperatures, large valve lifts with late control times are set then. Operation with a large valve lift shortly after the start of a cold internal combustion engine additionally has a favorable effect on the exhaust gas emissions, and is therefore utilized as part of a cold start emission reduction strategy (CSERS).

In the case of a warm internal combustion engine, in the middle rotational speed and low load range, small valve lifts with early control times are set in order to reduce the fuel consumption and the exhaust gas emissions. High torques and maximum power are obtained by setting larger valve lifts and earlier control times.

Under the demands of the California Air Resources Board (CARB), faults of systems which are used within the context of a CSERS must be detected by on-board diagnosis. It is additionally demanded that a gas exchange valve lift adjuster is detected as being faulty if, in internal combustion engines with a plurality of groups or banks of cylinders, all of the groups operate with an incorrect valve lift. In published, non-prosecuted German patent application DE 199 57 157 A1, as cited in the introduction, rotational oscillations of two cylinder groups are compared with one another. In the event of deviations, a functional signal is generated, which signalizes a fault. Such deviations occur if two cylinder banks operate with different valve lifts, but not if all of the cylinder banks operate with an incorrect valve lift.

SUMMARY OF THE INVENTION

It is accordingly an object of the invention to provide a method and a control unit for diagnosing a valve lift adjustment system of an internal combustion engine which overcomes the above-mentioned disadvantages of the prior art devices and methods of this general type, which permit reliable detection of faults in a valve lift adjusting system, in the case of which all of the groups of cylinders operate with an incorrect valve lift and have an effect on a CSERS.

With the foregoing and other objects in view there is provided, in accordance with the invention, a method for assessing a functional capability of a gas exchange valve lift adjuster of an internal combustion engine in dependence on a measure of rotational oscillation amplitudes of a camshaft. The method includes the steps of forming the measure of the rotational oscillation amplitudes repeatedly; checking whether a change in the measure of the rotational oscillation amplitudes occurs if the gas exchange valve lift adjuster changes a valve lift; and assessing the gas exchange valve lift adjuster as being functional if a measure for a change is greater than a predetermined threshold value.

By the invention, it is checked whether a change, which is to be expected, of the valve lift is reflected in the rotational oscillation amplitudes. Here, the rotational oscillation amplitudes can be measured using a camshaft sensor which is present in any case for the closed-loop control and diagnosis of the angular position of an intake camshaft. For the diagnosis, changes of the valve lift in normal operation of the internal combustion can be utilized so that the check does not require any interruption to the operation of the internal combustion engine, and can be carried out without additional sensors.

In accordance with an added mode of the invention, if the gas exchange valve lift adjuster has been assessed as being functional, the measure of the rotational oscillation amplitudes used for the assessing is stored in a non-volatile memory.

In accordance with an addition mode of the invention, a first measure of the rotational oscillation amplitudes is formed after a setting of a first value of the valve lift; and a second measure of the rotational oscillation amplitudes is formed after a setting of a second value of the valve lift.

In accordance with another mode of the invention, the checking step after the valve lift is set to a smaller valve lift setting is performed.

In accordance with a further mode of the invention, the first value of the valve lift is set at idle after a cold start of the internal combustion engine. The second value of the valve lift is set at idle when the internal combustion engine is warm.

In accordance with yet another mode of the invention, the first value of the valve lift is set in a case of a comparatively high torque or power demand on the internal combustion engine; and the second value of the valve lift is set in a case of a comparatively low torque or power demand on the internal combustion engine.

In accordance with yet a further mode of the invention, the first measure is formed in an n-th driving cycle, and the second measure is formed in an (n−1)-th driving cycle.

Before a check, which is carried out for a first time in a certain driving cycle, as to whether an attempt is reflected in a change in the measure of the rotational oscillation amplitudes, the following steps are performed: checking whether a second measure of the rotational oscillation amplitudes can be read out of a non-volatile memory; and carrying out the check with a newly-formed first measure and the second measure which is read out from the memory.

In accordance with another mode of the invention, the gas exchange valve lift adjuster is assessed as being functional if the measure for the change is greater than a predetermined threshold value. If the gas exchange valve lift adjuster is assessed as being non-functional, prevailing ambient conditions together with a fault message are store a time at which a fault occurred.

In accordance with a concomitant mode of the invention, in an event of a fault message based on a comparison of the first and second measures being formed in a driving cycle, prevailing ambient conditions at a time at which the first measure was formed are stored.

With the foregoing and other objects in view there is provided, in accordance with the invention, a control system for assessing a functional capability of a gas exchange valve lift adjuster of an internal combustion engine in dependence on a measure of rotational oscillation amplitudes of a camshaft. The control system contains a control unit programmed to: repeatedly form the measure of the rotational oscillation amplitudes; check whether a change in the measure of the rotational oscillation amplitudes occurs if the gas exchange valve lift adjuster changes a valve lift; and assess the gas exchange valve lift adjuster as being functional if a measure for the change is greater than a predetermined threshold value. Ideally the control unit is programmed to carry out the method in the various modes recited above.

Other features which are considered as characteristic for the invention are set forth in the appended claims.

Although the invention is illustrated and described herein as embodied in a method and a control unit for diagnosing a valve lift adjustment system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is an illustration showing the technical field of the invention;

FIGS. 2A and 2B are illustrations showing a known technical implementation of valve lift switching;

DETAILED DESCRIPTION OF THE INVENTION

Figure 3:
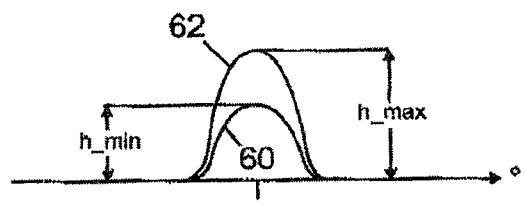
FIG. 3 is a graph showing corresponding profiles of the valve lift over the crankshaft rotational angle.

Referring now to the figures of the drawing in detail and first, particularly, to FIG. 1 thereof, there is shown an internal combustion engine 10 which has at least one combustion chamber/cylinder 12. An air/fuel mixture which flows into the combustion chamber 12 via an intake system 14 is ignited by a spark plug 16. After the combustion, resulting residual gases are discharged via an exhaust system 18. The filling and emptying of the combustion chamber 12, which is also referred to as a gas exchange, is controlled by at least one intake valve 20 and at least one exhaust valve 22 which are actuated by associated camshafts 24 and 26. Disposed between the intake valve 20 and the associated camshaft 24 is a valve lift adjusting system 28 which is activated by a control unit 30 with a signal B_vs. A valve lift adjusting system 31 can also be disposed between the exhaust valve 22 and its associated camshaft 26.

In order to control the valve lift and further functions of the internal combustion engine 10, the control unit 30 processes signals of various sensors which are not listed here in their entirety below: an air mass sensor 32 measures a mass mL of the air flowing into combustion chambers 12 of the internal combustion engine 10, which air is controlled by a throttle flap 34 and by the control unit 30 with a signal DK which determines the opening angle of the throttle flap 34. The opening angle DK of the throttle flap 34 is therefore known in the control unit 30 or is signaled to the control unit 30 if appropriate by a non-illustrated throttle flap sensor. A crankshaft sensor 36 measures an angular position ° CA and the rotational speed n of a crankshaft 38 of the internal combustion engine 10. Similarly, a camshaft sensor 40 measures the angular position ° NW of at least one of the two camshafts 24, 26. A driver demand transducer 42 transmits a torque demand to the control unit 30, and at least one exhaust gas probe 44 which is disposed in the exhaust system 18 of the internal combustion engine 10 delivers an item of information regarding the concentration of an exhaust gas constituent, preferably oxygen, to the control unit 30.

The control unit 30 is set up, in particular programmed, to carry out or control the process of at least one of the methods proposed here. Here, if a fault is detected, then, if appropriate after statistical validation, the fault is indicated by a fault lamp 50 which is activated by the control unit 30.

FIGS. 2A and 2B schematically show a known technical implementation of valve lift switching for the intake valve 20. The mechanism of the valve lift adjusting system 28, also referred to in the following as the valve lift adjuster 28, has two concentric bucket tappets 52, 54 which can be decoupled from one another (FIG. 2A) or coupled to one another (FIG. 2B) by the signal B_vs from FIG. 1. The camshaft 24 has cam regions 56, 58 of different eccentricity, with the outer cam regions 56 having a larger eccentricity and interacting with the outer bucket tappet 52. Here, the intake valve 20 is actuated by the inner bucket tappet 54.

In the case of FIG. 2A, the two concentric bucket tappets 52 and 54 are not coupled to one another, so that the inner bucket tappet 54 interacts with the region 58 of smaller eccentricity of the camshaft 24, which leads as a result to a comparatively small valve lift h_min. In this switching state of the valve lift adjuster 28, the relatively large movement of the outer bucket tappet 52 is not transmitted to the intake valve 20.

In the case of FIG. 2B, in contrast, the two bucket tappets 52 and 54 are coupled to one another, which at the same time leads to a decoupling of the inner bucket tappet 54 from its associated cam region 58. In this case, the relatively large eccentricity of the cam regions 56 is transmitted via the outer bucket tappets 52 and the inner bucket tappet 54 which is coupled thereto to the intake valve 20, resulting in a comparatively large valve lift h_max. FIG. 3 shows resulting valve lift curves 60, 62 over the angular position ° CA of the crankshaft 38.

Figure 4:
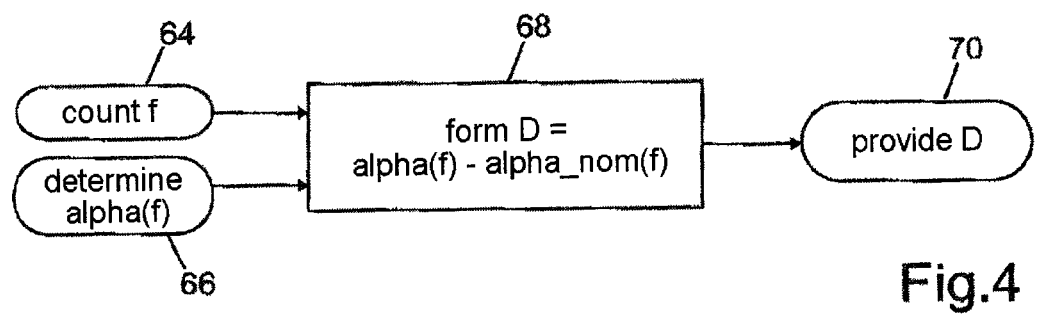
FIG. 4 is a functional block diagram showing a routine which is processed in the control unit during the evaluation of a signal of a camshaft sensor.

FIG. 4 shows a functional block diagram of a routine which is processed in the control unit 30 during the evaluation of the signal ° NW of the camshaft sensor 40. A routine of the type is carried out in any case, for the diagnosis of the camshaft adjuster, in variable valve controllers which also influence the phase shift between the camshafts 24 and 26 and/or the crankshaft by a camshaft adjustment. The rotation of a transducer wheel which is connected to the camshaft is reflected in the signal of the camshaft angle sensor 40. The camshaft angle sensor 40 therefore delivers a signal whose flanks correlate with angular positions of the camshaft. Four flanks f typically occur per camshaft rotation.

The block 64 counts the flanks f and the block 66 determines the angle alpha (f) of the present flank (f). The angle determination takes place in one embodiment by comparing flanks in the signal of the camshaft sensor with flanks in the signal of the crankshaft sensor 36. In a comparison timespan, the crankshaft sensor 36 delivers more flanks than the camshaft sensor 40. The spacing between two flanks of the signal of the camshaft sensor 40 can therefore be determined by the number of flanks of the signal of the crankshaft sensor 36 which are counted between the flanks. By counting time sections between two flanks of the crankshaft sensor, the angle resolution can be increased yet further.

The actual value, which is formed in this way or in some other way, of the angle alpha (f) of a flank f in the signal of the camshaft sensor 40 is compared in the block 68 with a nominal value alpha_nom (f) of the angle alpha (f). The comparison takes place in one embodiment by forming the difference D of the nominal value alpha_nom (f) and the actual value alpha (f). The difference D is provided by block 70 as a diagnosis variable and, within the context of an embodiment as a measure for rotational oscillation amplitudes, is also used for the diagnosis of the valve lift adjuster.

Figure 5:
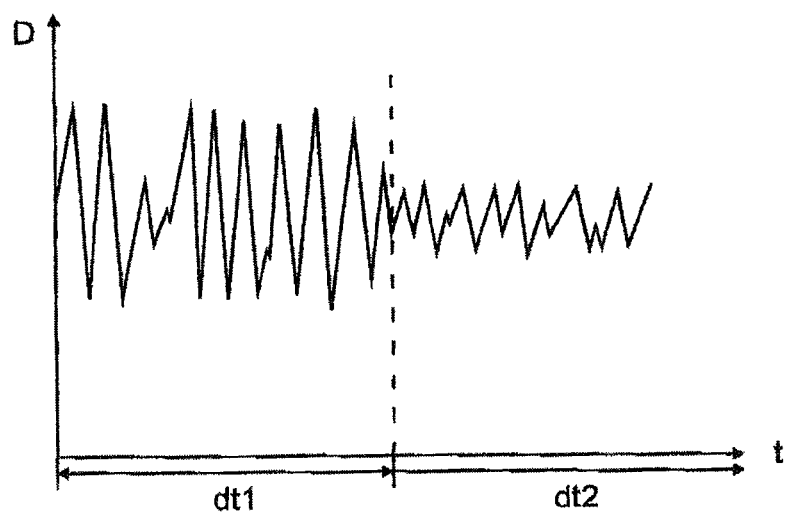
FIG. 5 is a graph showing a profile of a diagnosis variable over time for time sections with a large valve lift and with a small valve lift.

FIG. 5 shows the profile of the difference D or diagnosis variable D over the time t for a first time section dt_1 in which a large valve lift is set, and for a second, later time section dt_2 in which a small valve lift is set. It can be clearly seen that an oscillation, more precisely a rotational oscillation, whose rotational oscillation amplitude is approximately twice as large in the case of the large valve lift than in the case of the relatively small valve lift, is superposed on the mean value of the difference, which corresponds to a mean deviation of the angular position from a nominal value. The cause for the different rotational oscillation forms lies ultimately in that, during operation with a relatively large valve lift, greater elastic restoring forces from the valve actuating mechanism retroact on the camshaft.

Figure 6:
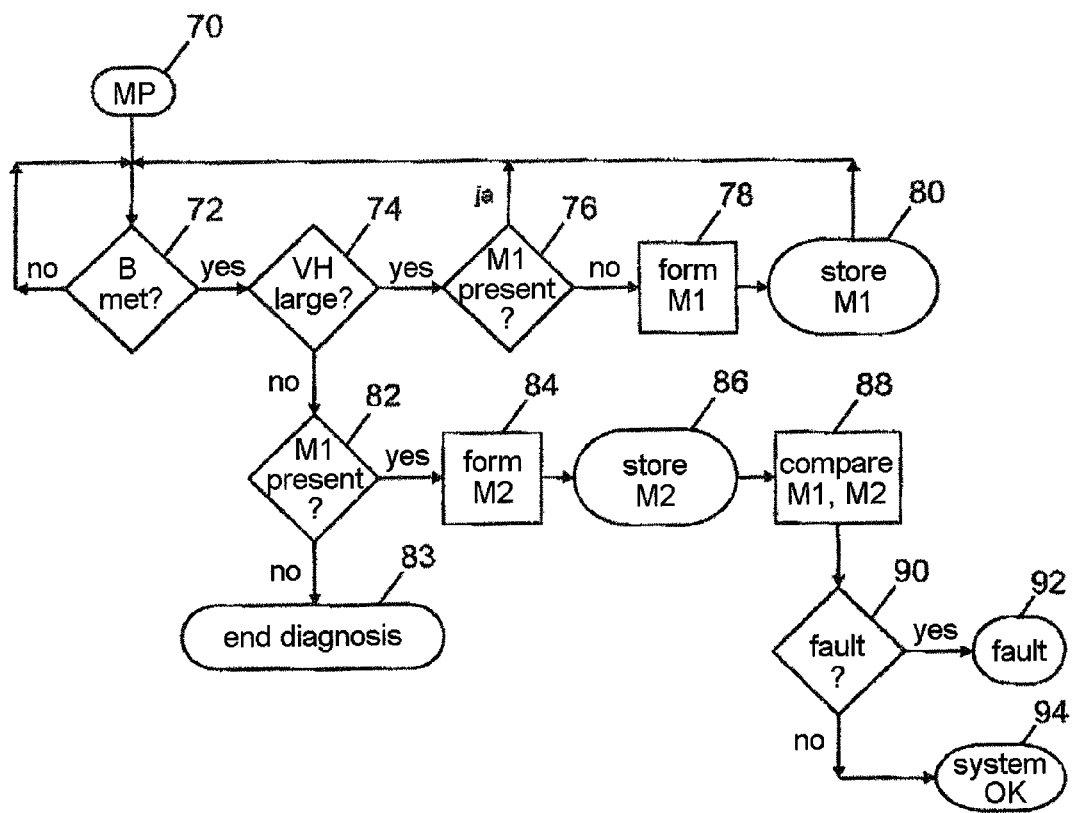
FIG. 6 is a flow chart showing a first exemplary embodiment of a method according to the invention.

FIG. 6 shows a first embodiment (diagnosis strategy I) of a method according to the invention, as is carried out by the control unit 30 from FIG. 1. Here, in a step 72 which is reached from a superordinate main program MP in the step 70 for controlling the internal combustion engine 10, it is checked whether certain operating conditions B are met. An example of such a condition is that the internal combustion engine 10 is running at idle. When the operating condition is met, a step 74 follows in which the control unit 30, in one embodiment, checks whether or not the internal combustion engine 10 should presently be operated with a large valve lift VH. The internal combustion engine 10 should be operated with a large valve lift VH for example when the above-described conditions for a CSERS are present. If this is the case, it is checked in step 76 whether a first measure M1 of the rotational oscillation amplitudes has already been formed while the internal combustion engine 10 is cold. During the first run-through of the described sequence of steps after a start, this is not yet the case, so that the method follows a step 78 in which the first measure M1 is formed while the internal combustion engine 10 is cold. The first measure M1 is thus formed in particular while a CSERS is being carried out. The first measure M1 is set at idle in particular after a cold start of the internal combustion engine, with a large valve lift as the first value of the valve lift.

As has already been mentioned, in the case of a functional valve lift adjusting system, a large valve lift VH should be set during the CSERS. The first measure M1 is, in one embodiment, formed by the following sequence of steps:

formation of a sliding mean value of the difference or diagnosis value illustrated in FIG. 5, formation of the magnitude of the deviation of the diagnosis variable from the sliding mean value, integration of the magnitude, and normalization of the integration result to the integration time.

The greater the value obtained for M1, the larger the rotational oscillation amplitude and therefore the amplitude of the oscillation of the diagnosis variable D from FIG. 5 is. In an alternative embodiment, the first measure M1 is formed by the following sequence of steps:

formation of a sliding mean value of the difference or diagnosis value illustrated in FIG. 5, formation of the magnitude of the deviation of the diagnosis variable from the sliding mean value, and accumulation of the magnitude.

A further alternative embodiment provides the formation of the first measure M1 by the following steps:

determining the minimum and the maximum of the difference or diagnosis variable during one camshaft rotation, forming the difference between the minimum and maximum, and accumulation of the difference.

In step 80, the first measure M1 is stored, and the method returns to step 72. As long as the CSERS function is to be active, a sequence of steps 72, 74, 76 will then be run through repeatedly since the query in step 76 is affirmed after the first formation of the variable M1.

If the CSERS function is then no longer to be active, for example because a predefined timespan has expired after a cold start of the internal combustion engine 10, the step 74 is followed by a step 82 in which it is checked again whether a first measure M1 is present. If this is not the case, the diagnosis is ended by a branch to step 83.

If, in contrast, a measure M1 has already been formed in the present driving cycle, there follows a step 84 in which a second measure M2 for the rotational oscillation amplitudes is formed. As has already been mentioned, a small valve lift VH should be set outside the CSERS at idle. When the internal combustion engine is warm, at idle, the smaller, second value of the valve lift is set.

Overall, therefore, a setting of a first value of the valve lift is required first, during an active CSERS. When the first value is required, a first measure of the rotational oscillation amplitudes is formed. When the CSERS is ended, a setting of a second value of the valve lift is required, and when the second value is required, a second measure of the rotational oscillation amplitudes is formed.

The second value of the valve lift is preferably smaller than the first value of the valve lift, when the check after a cold start takes place. The reason for this is that a large valve lift is initially set after a cold start in any case. The utilization of this predefined sequence during the diagnosis therefore permits an early diagnosis without interrupting the operation of the internal combustion engine.

The formation of the second measure M2 preferably takes place in the same way as the formation of the first measure M1, that is to say by normalizing an integral of deviations of the rotational oscillation amplitudes from their mean value, or by one of the two other alternatives specified further above. This ensures the comparability of the measures M1 and M2. The second measure M2 is stored in step 86.

A comparison of the first measure M1 with the second measure M2 then takes place in step 88. For this purpose, in one embodiment of the step 88, the difference M1−M2 or the quotient M1/M2 is formed as a comparison result, and in step 90, it is checked whether the comparison result meets a fault criterion. As FIG. 5 shows, different rotational oscillation amplitudes and therefore different measures M1, M2 can be expected when the valve lift adjusting system is functional. If the formed values for M1, M2 are too similar, this is evaluated in step 92 as a fault.

As a criterion for the similarity, in the case of the difference M1−M2, the magnitude of the difference M1−M2 can be compared with a threshold value. In the case of the quotient M1/M2, the deviation of the quotient from the value 1 can be compared with a threshold value. In both cases, a fault manifests itself in that the threshold value is not exceeded. The program then branches to step 92 in which a fault is evaluated. If, in contrast, the threshold value is exceeded, or more generally, if the fault criterion in step 90 is not met, the valve lift adjusting system is evaluated in step 94 as being functional (OK).

Figure 7:
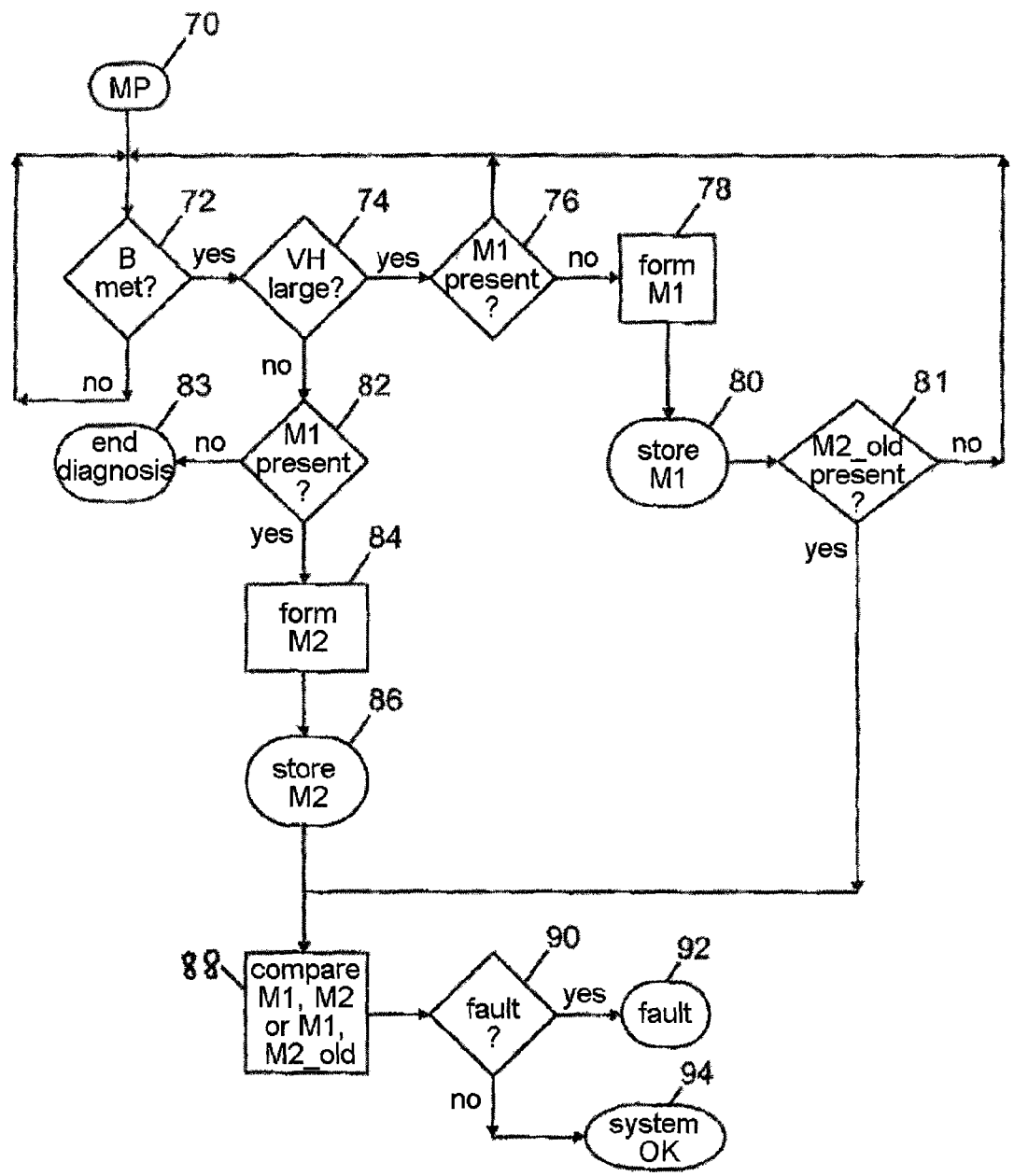
FIG. 7 is a flow chart showing a second exemplary embodiment of a method according to the invention.

FIG. 7 shows a second embodiment (diagnosis strategy II) of a method according to the invention, as is carried out by the control unit 30 from FIG. 1. Here, steps 70 to 94 are carried out, as have already been explained in connection with the diagnosis strategy I from FIG. 6. For understanding of the steps 70 to 94, reference is therefore made to the corresponding explanations with regard to the diagnosis strategy I.

For clarification of the differences between the diagnosis strategies I and II, it is to be noted that the diagnosis strategy I detects a fault only once the two measures M1 and M2 have been determined within a driving cycle. As a result, the diagnosis strategy I provides a measurement and evaluation of the diagnosis variable at idle after a cold start. At this time, the engine should be operated with a large valve lift. The result of the evaluation is stored as a first measure M1. At a later time, when the internal combustion engine 10 is to be operated with a relatively small valve lift, the diagnosis variable should again be measured at idle and evaluated in the "warm" evaluation window (steps 84 and 86 in FIG. 6). The result of the second evaluation is stored as a second diagnosis variable M2. At the time of the determination of the second measure M2, the CSERS function is thus already concluded.

The diagnosis strategy II of FIG. 7, in contrast, permits fault detection during an active CSERS. This is obtained in that, after the formation of the first measure M1 in a present driving cycle, a second measure M2 from a previous driving cycle is used. For this purpose, the embodiment of FIG. 7 provides that, after the step 80 in which the first measure M1 is stored, it is initially queried by a step 81 whether a second measure M2_old from a previous driving cycle is present. If the query is affirmed, the program branches to the already-described step 88 in which the first measure M1 is compared with the second measure M2, in this case the second measure M2_old. If, in contrast, no second measure M2_old from a previous driving cycle is available, the query in step 81 is negated and a return is then made to step 72 as has already been described in connection with FIG. 6. An embodiment of the diagnosis strategy II is therefore characterized in that the first measure is formed in an n-th driving cycle, and the second measure is formed in an (n−1)-th driving cycle.

Here, in the context of the diagnosis strategy II, before a check, which is carried out for the first time in a certain driving cycle, as to whether an attempt to change the valve lift is reflected in a change in the measure for rotational oscillation amplitudes, it is initially checked whether a second measure of the rotational oscillation amplitudes can be read out of the non-volatile memory. If this is the case, the check is carried out with the newly-formed first measure and the second measure which is read out from the memory.

In order to be able to carry out the diagnosis strategy II, after each OK evaluation of the system, the present second measure M2 is written as M2_old into a non-volatile memory of the control unit 30, so that this can be queried in a following driving cycle. The storage thus takes place in particular when the gas exchange valve lift adjuster is assessed as being functional.

As has already been mentioned further above, the internal combustion engine 10 is operated with a large valve lift not only in the context of a CSERS function. Large valve lifts are also set when the internal combustion engine 10 is warm in order to obtain high torque values and, at a simultaneously high rotational speed, high power values. In the range of medium rotational speeds and low torque demand, in contrast, in the case of a functional valve lift adjusting system, small valve lifts are set in order to reduce the fuel consumption and the exhaust gas emissions.

In a third embodiment, also referred to as a diagnosis strategy III, a measure for the rotational oscillation amplitudes in operating states with a large valve lift VH_large and with a small valve lift VH_small is measured and evaluated if predetermined operating conditions are met. Depending on the operating state, the formed measure is stored as M_VH_large for the large valve lift VH_large or as a measure M_VH_small for the small valve lift VH_small. Here, the large value VH_large is set in the event of a comparatively high torque or power demand on the internal combustion engine, and the second, relatively small value VH_small is set in the event of a comparatively low torque or power demand on the internal combustion engine.

After the evaluation of one operating state is complete, the evaluation of the in each case other operating state is awaited. If this has also taken place, both results are evaluated for fault detection.

Figure 8:
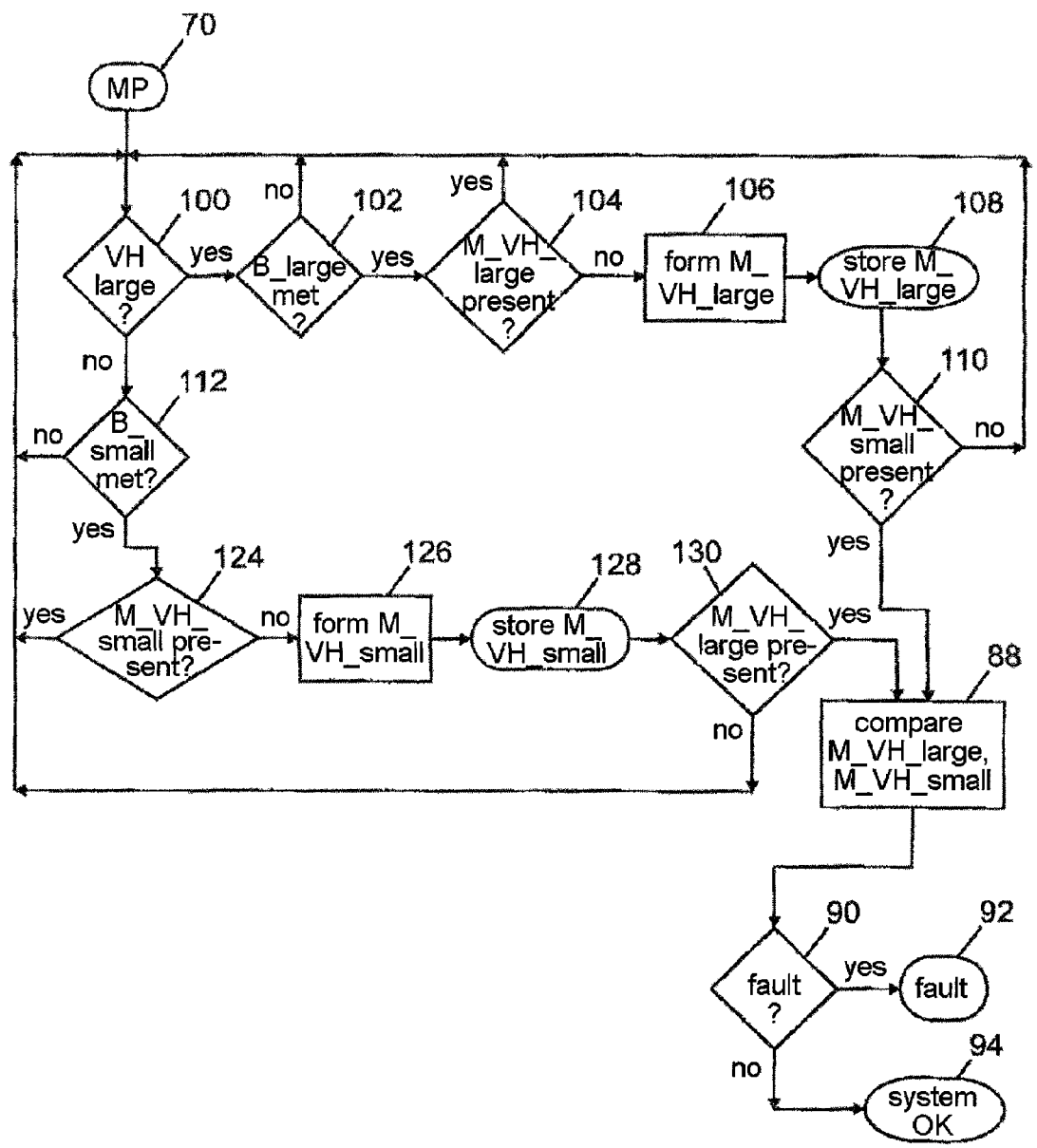
FIG. 8 is a flow chart showing a third exemplary embodiment of a method according to the invention.

FIG. 8 shows a flow diagram of such an embodiment. For this purpose, in a step 100 which is reached from a superordinate main program MP, which expires in step 70, for controlling the internal combustion engine 10, it is checked whether a large valve lift VH_large is to be presently set. If this query is affirmed, there follows a step 102 in which it is checked whether predetermined operating conditions B_large are met, which permit an evaluation of rotational oscillation amplitudes at a large valve lift VH_large. If this query is also affirmed, there follows a step 104 in which it is checked whether a measure M_VH_large is already present. During the first run-through of the sequence of steps, this is generally not the case, so that the method branches to the step 106 in which a measure M_VH_large is formed.

The measure M_VH_large is formed here by one of the embodiments as have been explained further above with the formation of the measures M1 and M2. The result is stored as the measure M_VH_large in step 108. In the following step 110, it is checked whether a measure M_VH_small is already present, which will not be the case during the first run-through of the method. The program correspondingly branches back to step 100. As long as the large valve lift VH_large is to remain set, the sequence of steps 100, 102 and 104 will be run through repeatedly since the query in step 104 is affirmed after the first storing of the measure M_VH_large.

If a relatively small valve lift VH_small is then demanded at some time, the query in step 100 is negated and there follows a step 112 in which it is checked whether operating conditions B_small for the formation of a measure M_VH_small for rotational oscillation amplitudes at a small valve lift VH_small are met. An affirmation of the query leads to the step 124 which checks whether a measure M_VH_small is present. If this is not the case, there follows in step 126 a formation of the measure M_VH_small for the amplitude of the rotational oscillations at a small valve lift, and a storage of the measure in step 128.

The step 130 then serves to check whether a measure M_VH_large is present. If the query is affirmed, the program branches to the sequence of steps from steps 88 to 94, which have already been explained and in which M_VH_large and M_VH_small are compared with one another in order to assess the valve lift adjusting system as being functional (system OK) or, in step 92, as faulty.

Each of the three diagnosis strategies I, II and III therefore constitutes an exemplary embodiment of a method for assessing the functionality of a gas exchange valve lift adjuster of an internal combustion engine as a function of a measure for rotational oscillation amplitudes of a camshaft, in which method the measure for the rotational oscillation amplitudes is formed repeatedly, in which method, in a situation in which the gas exchange valve lift adjuster is to change the valve lift, it is checked whether a change in the measure of the rotational oscillation amplitudes occurs, and in which method the gas exchange valve lift adjuster is assessed as being functional if a measure for the change is greater than a predetermined threshold value. In one preferred embodiment, the prevailing ambient conditions are stored at the time at which a fault occurs. An ensemble of such ambient conditions is also referred to below as a freeze frame. Such ambient conditions are for example values of the rotational speed, a temperature T, a driver demand or other operating parameters of the internal combustion engine 10. If the measure M2_old is provided for fault detection (diagnosis strategy II), a freeze frame is always stored in the event of a fault being detected.

If the second measure M2_old is not provided for fault detection (diagnosis strategy I), valve lift faults which occur when a CSERS is active can in principle be detected only during the later formation of the measure M2 after the warm-running phase. Since the fault is generally present in the cold state, the prevailing ambient conditions at the time at which the fault is detected no longer correlate with the ambient conditions which prevailed when the fault occurred in the cold state. For this reason, M2_old is used in order to set a fault suspicion after the formation of the first measure M1 when the internal combustion engine is cold.

A fault suspicion is set if the difference between the first measure M1 and the second measure M2_old is less than a predetermined threshold value. A freeze frame is immediately stored in the event of a fault suspicion. If no fault suspicion is present, then in the same driving cycle, a freeze frame is stored in the case of a later fault detection after the "warm" evaluation window. Always only one freeze frame is therefore stored during a journey, either in the event of a fault suspicion, or in the event of a fault being detected.

The invention claimed is:

1. A method for assessing a functional capability of a gas exchange valve lift adjuster of an internal combustion engine in dependence on a measure of rotational oscillation amplitudes of a camshaft, which comprises the steps of:
    forming the measure of the rotational oscillation amplitudes repeatedly;
    checking whether a change in the measure of the rotational oscillation amplitudes occurs if the gas exchange valve lift adjuster changes a valve lift; and
    assessing the gas exchange valve lift adjuster as being functional if a measure for a change is greater than a predetermined threshold value.

2. The method according to claim 1, wherein if the gas exchange valve lift adjuster has been assessed as being functional, storing the measure of the rotational oscillation amplitudes used for the assessing in a non-volatile memory.

3. The method according to claim 1, which further comprises:
    forming a first measure of the rotational oscillation amplitudes after a setting of a first value of the valve lift; and
    forming a second measure of the rotational oscillation amplitudes after a setting of a second value of the valve lift.

4. The method according to claim 1, which further comprises performing the checking step after the valve lift is set to a smaller valve lift setting.

5. The method according to claim 3, which further comprises setting the first value of the valve lift at idle after a cold start of the internal combustion engine.

6. The method according to claim 3, which further comprises setting the second value of the valve lift at idle when the internal combustion engine is warm.

7. The method according to claim 3, which further comprises:
    setting the first value of the valve lift in a case of a comparatively high torque or power demand on the internal combustion engine; and
    setting the second value of the valve lift in a case of a comparatively low torque or power demand on the internal combustion engine.

8. The method according to claim 3, which further comprises:
    forming the first measure in an n-th driving cycle; and
    forming the second measure in an (n−1)-th driving cycle.

9. The method according to claim 1, wherein, before a check, which is carried out for a first time in a certain driving cycle, as to whether an attempt is reflected in a change in the measure of the rotational oscillation amplitudes, performing the following steps:
    checking whether a second measure of the rotational oscillation amplitudes can be read out of a non-volatile memory; and carrying out the check with a newly-formed first measure and the second measure which is read out from the memory.

10. The method according to claim 1, which further comprises assessing the gas exchange valve lift adjuster as being functional if the measure for the change is greater than a predetermined threshold value.

11. The method according to claim 1, wherein if the gas exchange valve lift adjuster is assessed as being non-functional, storing prevailing ambient conditions together with a fault message at a time at which a fault occurred.

12. The method according to claim 3, wherein in an event of a fault message based on a comparison of the first and second measures formed in a driving cycle, storing prevailing ambient conditions at a time at which the first measure was formed.

13. A control system for assessing a functional capability of a gas exchange valve lift adjuster of an internal combustion engine in dependence on a measure of rotational oscillation amplitudes of a camshaft, the control system comprising:
   a control unit programmed to:
      repeatedly form the measure of the rotational oscillation amplitudes;
      check whether a change in the measure of the rotational oscillation amplitudes occurs if the gas exchange valve lift adjuster changes a valve lift; and
      assess the gas exchange valve lift adjuster as being functional if a measure for the change is greater than a predetermined threshold value.

14. The control system according to claim 13, wherein said control unit is programmed to store the measure of the rotational oscillation amplitudes in a non-volatile memory if the gas exchange valve lift adjuster has been assessed as being functional.

15. The control system according to claim 13, wherein said control unit is programmed to:
   form a first measure of the rotational oscillation amplitudes after a setting of a first value of the valve lift; and
   form a second measure of the rotational oscillation amplitudes after a setting of a second value of the valve lift.

16. The control system according to claim 13, wherein said control unit is programmed to perform the checking step after the valve lift is set to a smaller valve lift setting.

17. The control system according to claim 15, wherein said control unit is programmed to set the first value of the valve lift at idle after a cold start of the internal combustion engine.

18. The control system according to claim 15, wherein said control unit is programmed to set the second value of the valve lift at idle when the internal combustion engine is warm.

19. The control system according to claim 15, wherein said control unit is programmed to:
   set the first value of the valve lift in a case of a comparatively high torque or power demand on the internal combustion engine: and
   set the second value of the valve lift in a case of a comparatively low torque or power demand on the internal combustion engine.

20. The control system according to claim 15, wherein said control unit is programmed to:
   form the first measure in an n-th driving cycle; and
   form the second measure in an (n−1)-th driving cycle.

21. The control system according to claim 13, wherein said control unit is programmed to perform the following steps before a check, which is carried out for a first time in a certain driving cycle, as to whether an attempt is reflected in a change in the measure of the rotational oscillation amplitudes:
   check whether a second measure of the rotational oscillation amplitudes can be read out of a non-volatile memory; and
   carry out the check with a newly-formed first measure and the second measure which is read out from the memory.

22. The control system according to claim 13, wherein said control unit is programmed to assess the gas exchange valve lift adjuster as being functional if the measure for the change is greater than the predetermined threshold value.

23. The control system according to claim 13, wherein said control unit is programmed to store prevailing ambient conditions together with a fault message at a time at which a fault occurred if the gas exchange valve lift adjuster is assessed as being non-functional.

24. The control system according to claim 15, wherein said control unit is programmed to store prevailing ambient conditions at a time at which the first measure was formed in an event of a fault message based on a comparison of the first and second measures formed in a driving cycle.

* * * * *